(12) United States Patent
Hao

(10) Patent No.: US 9,971,208 B2
(45) Date of Patent: May 15, 2018

(54) LIQUID CRYSTAL DISPLAY PANEL AND LIQUID CRYSTAL DISPLAY DEVICE

(71) Applicant: Shenzhen China Star Optoelectronics Technology Co., Ltd., Shenzhen, Guangdong (CN)

(72) Inventor: Sikun Hao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 237 days.

(21) Appl. No.: 14/915,271

(22) PCT Filed: Feb. 22, 2016

(86) PCT No.: PCT/CN2016/074222
§ 371 (c)(1),
(2) Date: Feb. 29, 2016

(87) PCT Pub. No.: WO2017/124596
PCT Pub. Date: Jul. 27, 2017

(65) Prior Publication Data
US 2018/0045999 A1   Feb. 15, 2018

(30) Foreign Application Priority Data
Jan. 19, 2016 (CN) .......................... 2016 1 0035941

(51) Int. Cl.
*G02F 1/1343* (2006.01)
*G02F 1/1333* (2006.01)

(52) U.S. Cl.
CPC ...... *G02F 1/1343* (2013.01); *G02F 1/133345* (2013.01)

(58) Field of Classification Search
CPC ...... G02F 1/1333; G02F 1/1343; G02F 1/136; G02F 1/1368; G02F 1/133345; G02F 1/136286; G02F 1/134363; G02F 1/134309; G02F 1/13439; G02F 1/136227; G02F 1/133707; G02F 1/134336; G02F 1/136213; G02F 1/1362; G02F 1/133711; G02F 2201/123; G02F 2201/40; G02F 2201/124;
(Continued)

(56) References Cited

U.S. PATENT DOCUMENTS 7,924,386 B2* 4/2011 Lee .................. G02F 1/134363
349/141
2004/0212770 A1 10/2004 Lee
(Continued)

FOREIGN PATENT DOCUMENTS

CN         105404062 A       3/2016

*Primary Examiner* — Thoi Duong
(74) *Attorney, Agent, or Firm* — Andrew C. Cheng

(57) ABSTRACT

A liquid crystal display panel and a liquid crystal display device are disclosed. The liquid crystal display panel can decrease an overlapped area between the common electrode and the pixel electrode through partial overlapping of the pixel electrode and the common electrode, and an overlapped portion of the common electrode and the pixel electrode is a hollow structure. Therefore, the liquid crystal display panel of the present invention can decrease a storage capacitor between the pixel electrode and the common electrode, the driving voltage of the liquid crystal display panel, the pixel charging time and the power consumption of the liquid crystal display panel.

4 Claims, 6 Drawing Sheets

(58) Field of Classification Search
CPC ........ G02F 2001/134372; G02F 2001/134318;
G02F 2001/133357; G02F 2001/134381;
H01L 27/3248; H01L 27/3276; G09G
2300/0426; G09G 3/3648
USPC .............. 349/43, 141, 138, 143, 139, 38, 42
See application file for complete search history.

(56) References Cited

U.S. PATENT DOCUMENTS

| | | | |
|---|---|---|---|
| 2010/0103359 A1* | 4/2010 | Yuh ................... | G02F 1/134363 349/139 |
| 2014/0307214 A1* | 10/2014 | Saitoh ............... | G02F 1/134363 349/139 |
| 2015/0212372 A1 | 7/2015 | Moon et al. | |
| 2016/0202584 A1* | 7/2016 | Liang ................ | G02F 1/136286 349/43 |
| 2016/0291417 A1 | 10/2016 | Choi et al. | |
| 2017/0192311 A1 | 7/2017 | Gan | |

* cited by examiner

LIQUID CRYSTAL DISPLAY PANEL AND LIQUID CRYSTAL DISPLAY DEVICE

BACKGROUND OF THE INVENTION

1. Field of the Invention

The present invention relates to a liquid crystal display technology field, and more particularly to a liquid crystal display panel and a liquid crystal display device.

2. Description of Related Art

A liquid crystal display device is a most widely used flat display device currently, along with the development of the liquid crystal display device technology, people propose a higher request for the display quality, the exterior design, the low cost and the high penetration rate of the liquid crystal display device.

The liquid crystal display device adopted currently usually includes two types: one type is formed by an upper substrate, a lower substrate and an intermediate liquid crystal layer, and the substrate is formed by glass or an electrode, and so on. For example, a TN (Twist Nematic) mode, a VA (Vertical Alignment) mode and a MVA (Multidomain Vertical Alignment) mode developed for solving too narrow viewing angle. The other type is that the electrode is only located at a side of the substrate to form a display having a lateral electric field mode such as IPS (In-plane switching) mode, FFS (Fringe Field Switching) mode, etc.

Wherein, the FFS mode is a wide-viewing angle technology that is derived from the IPS mode. The structure of the FFS mode disposes a common electrode below a gap between electrodes. A fringe electric field will be generated by applying a voltage such that liquid crystal will rotate above the electrodes. By the fringe electric field, the liquid crystal molecules which are almost arranged homogeneously rotate inside a surface layer of the electrode in order to reach features of high penetration and large viewing angle. With reference to FIG. 1 and FIG. 2, wherein FIG. 1 is a pixel structure diagram of a liquid crystal display panel in the conventional art and FIG. 2 is a cross-sectional view of the pixel structure along a A-A' cutting line in FIG. 1. As shown in FIG. 1 and FIG. 2, in the FFS liquid crystal display panel 1 of the conventional art, a pixel electrode 15 and a common electrode 14 are completely overlapped, a passivation (referred to PV) layer 13 between the pixel electrode 15 and the common electrode 14 is very thin such that a large storage capacitor is formed between the pixel electrode 15 and the common electrode 14, a too large storage capacitor will cause insufficient charging of the liquid crystal display panel, too heavy resistor and capacitor load, and too long pixel charging time.

SUMMARY OF THE INVENTION

Accordingly, the present invention provides a liquid crystal display panel and a display device, which can reduce a pixel storage capacitor, increase a pixel charging ability and decrease a driving voltage of the liquid crystal display panel in order to decrease the power consumption of the liquid crystal display panel.

A first aspect of the present invention provides a liquid crystal display panel, comprising: a common electrode, a first pixel electrode, a second pixel electrode and a passivation layer; the first pixel electrode and the second pixel electrode are arranged separately; the first pixel electrode and the common electrode are partially overlapped, and the second pixel electrode and the common electrode are partially overlapped; portions of the common electrode that correspond to an overlapped portion of the common electrode and the first pixel electrode and correspond to an overlapped portion of the common electrode and the second pixel electrode are hollow structures; an area of the hollow structure is less than an area of the first pixel electrode or an area of the second pixel electrode; the passivation layer is disposed between the common electrode and the first pixel electrode, and is disposed between the common electrode and the second pixel electrode; portions of the passivation layer that correspond to a non-overlapped region of the common electrode and the first pixel electrode and correspond to a non-overlapped region of the common electrode and the second pixel electrode are provided with concave slots.

Wherein, the liquid crystal display panel further includes a substrate, a gate insulation layer, a signal line and a PFA organic film layer, wherein, the gate insulation layer is disposed on the substrate;
the signal line is disposed separately on the gate insulation layer;
the PFA organic film layer covers on the signal line and is extended on the gate insulation layer;
the common electrode is disposed on the PFA organic film layer;
the passivation layer covers the common electrode; and
the first pixel electrode and the second pixel electrode are disposed separately on the passivation layer.

A second aspect of the present invention provides a liquid crystal display panel, comprising: a common electrode, a first pixel electrode and a second pixel electrode; the first pixel electrode and the second pixel electrode are arranged separately; the first pixel electrode and the common electrode are partially overlapped, and the second pixel electrode and the common electrode are partially overlapped; portions of the common electrode that correspond to an overlapped portion of the common electrode and the first pixel electrode and correspond to an overlapped portion of the common electrode and the second pixel electrode are hollow structures.

Wherein, the liquid crystal display panel further includes a passivation layer, wherein the passivation layer is disposed between the common electrode and the first pixel electrode, and is disposed between the common electrode and the second pixel electrode.

Wherein, portions of the passivation layer that correspond to a non-overlapped region of the common electrode and the first pixel electrode and correspond to a non-overlapped region of the common electrode and the second pixel electrode are provided with concave slots.

Wherein, an area of the hollow structure is less than an area of the first pixel electrode or an area of the second pixel electrode.

Wherein, the liquid crystal display panel further includes a substrate, a gate insulation layer, a signal line and a PFA organic film layer, wherein, the gate insulation layer is disposed on the substrate;
the signal line is disposed separately on the gate insulation layer;
the PFA organic film layer covers on the signal line and is extended on the gate insulation layer;
the common electrode is disposed on the PFA organic film layer;
the passivation layer covers the common electrode; and the first pixel electrode and the second pixel electrode are disposed separately on the passivation layer.

A third aspect of the present invention provides a liquid crystal display device, wherein, the liquid crystal display device includes a liquid crystal display panel, and the liquid crystal display panel comprises: a common electrode, a first pixel electrode and a second pixel electrode; the first pixel electrode and the second pixel electrode are arranged separately; the first pixel electrode and the common electrode are partially overlapped, and the second pixel electrode and the common electrode are partially overlapped; portions of the common electrode that correspond to an overlapped portion of the common electrode and the first pixel electrode and correspond to an overlapped portion of the common electrode and the second pixel electrode are hollow structures.

Wherein, the liquid crystal display panel further includes a passivation layer, wherein the passivation layer is disposed between the common electrode and the first pixel electrode, and is disposed between the common electrode and the second pixel electrode.

Wherein, portions of the passivation layer that correspond to a non-overlapped region of the common electrode and the first pixel electrode and correspond to a non-overlapped region of the common electrode and the second pixel electrode are provided with concave slots.

Wherein, an area of the hollow structure is less than an area of the first pixel electrode or an area of the second pixel electrode.

Wherein, the liquid crystal display panel further includes a substrate, a gate insulation layer, a signal line and a PFA organic film layer, wherein, the gate insulation layer is disposed on the substrate;

the signal line is disposed separately on the gate insulation layer;

the PFA organic film layer covers on the signal line and is extended on the gate insulation layer;

the common electrode is disposed on the PFA organic film layer;

the passivation layer covers the common electrode; and the first pixel electrode and the second pixel electrode are disposed separately on the passivation layer.

Through above solution, the beneficial effects of the present invention are: comparing with the conventional art, the liquid crystal display panel and the liquid crystal display device of the present invention, through providing a hollow structure on the common electrode of the array substrate such that an overlapped area between the common electrode and the pixel electrode is decreased in order to realize the purpose of decreasing the storage capacitor between the common electrode and the pixel electrode so as to decrease the driving voltage of the liquid crystal display panel, decreasing the pixel charging time and decreasing the power consumption of the liquid crystal display panel.

DETAILED DESCRIPTION OF THE PREFERRED EMBODIMENT

The following will combine the figure and the embodiment to describe the present invention in detail. It can be understood that the specific embodiment described here is only used for explaining the present invention, not used to limit the present invention.

A liquid crystal display panel includes a color filter substrate (referred as CF substrate) and an array substrate (Thin Film Transistor Substrate, referred as TFT substrate) which are disposed separately and liquid crystal (liquid crystal molecules). The liquid crystal is located inside a liquid crystal cell formed by overlapping the array substrate and the color filter substrate. Wherein, the TFT substrate usually includes a glass substrate, a common electrode, a gate electrode, a gate insulation layer, an amorphous silicon layer, an active semiconductor layer, a source electrode, a drain electrode, a passivation layer and a pixel electrode. Besides, the TFT substrate can further provide a PFA organic film layer above the gate insulation layer. The PFA organic film layer is used to reduce a parasitic capacitor of the liquid crystal display panel. Wherein, the PFA organic film is a polymer film, which can adopt acrylic resins, epoxy compounds and polyvinyl alcohol and so on. The PFA organic film layer also has an insulation function.

Figure 1:
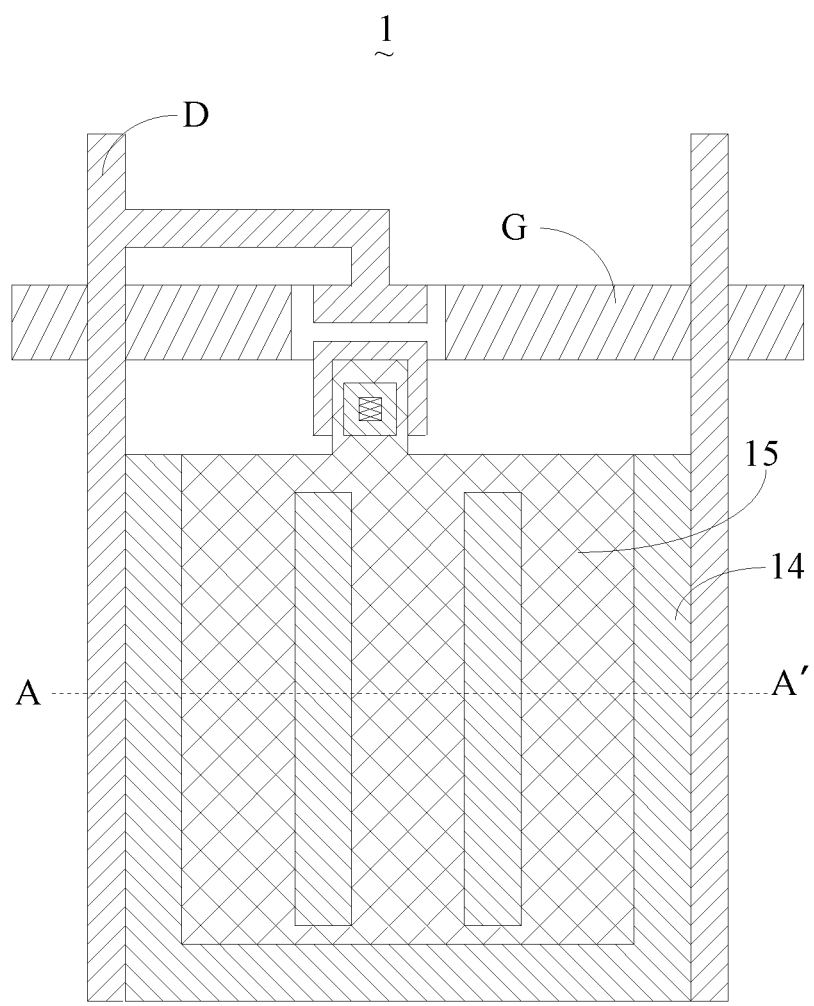
FIG. 1 is a pixel structure diagram of a liquid crystal display panel in the conventional art.
Figure 2:
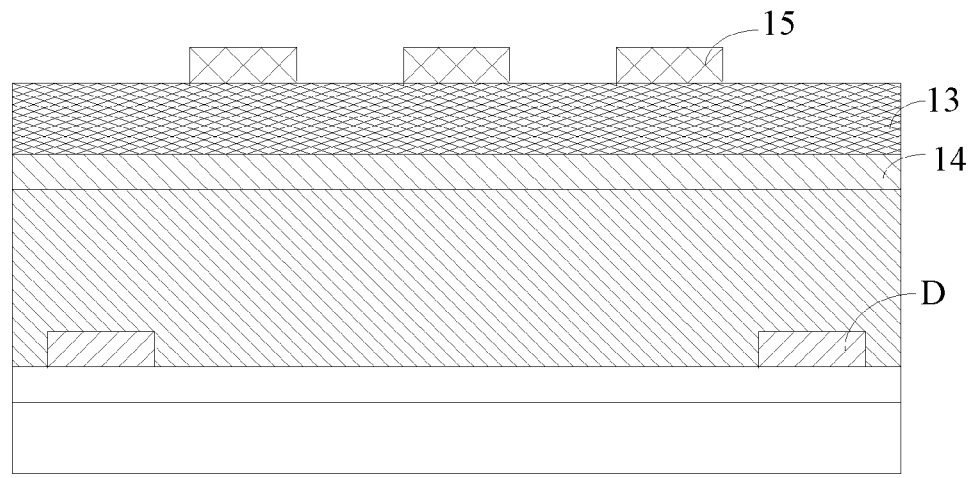
FIG. 2 is a cross-sectional view of the pixel structure along a A-A' cutting line in FIG. 1.
Figure 3:
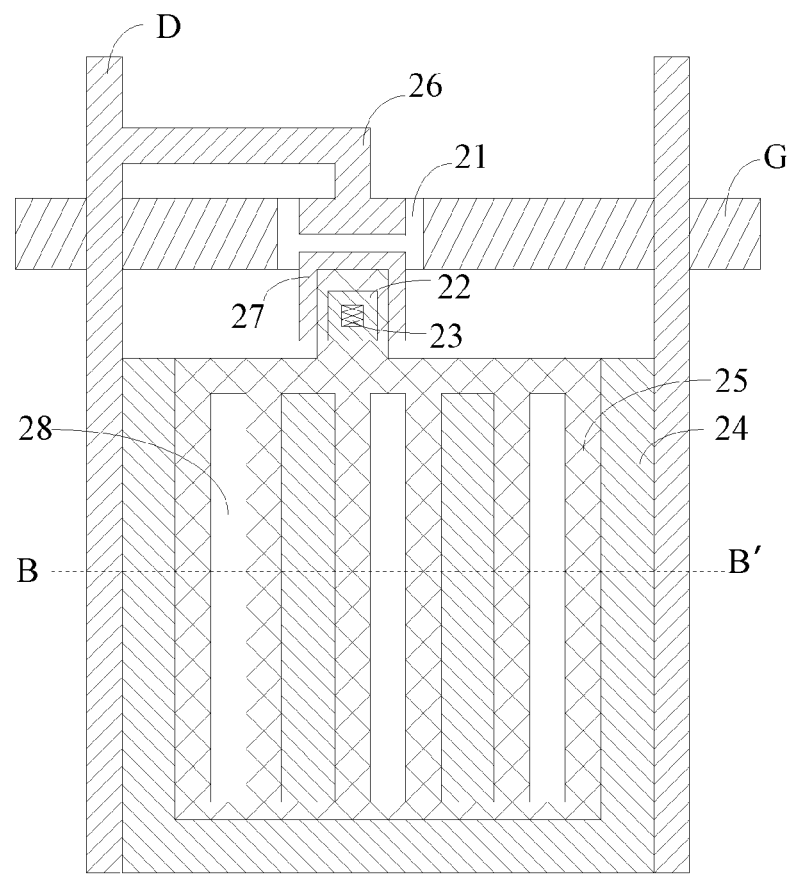
FIG. 3 is a schematic diagram of a pixel structure of a liquid crystal display panel of an embodiment of the present invention.

With reference to FIG. 3, and FIG. 3 is a schematic diagram of a pixel structure of a liquid crystal display panel of an embodiment of the present invention. As shown in FIG. 3, a liquid crystal display panel 2 disclosed by the present embodiment includes a substrate (not shown in FIG. 3), multiple signal lines D disposed along a column direction and multiple scanning lines G disposed along a row direction, wherein, the multiple scanning lines G and the multiple signal lines D are disposed perpendicularly and alternately. Wherein, the multiple scanning lines G and the multiple signal lines D alternately form multiple pixel units. Each of the pixel unit includes multiple pixel electrodes 25 and multiple common electrodes 24. The common electrodes 24 and the pixel electrodes 25 are disposed separately in order to form a storage capacitor. The liquid crystal display panel 2 further includes a thin-film transistor. A gate electrode (not shown in the figure) of the thin-film transistor is disposed on the scanning line G, a source electrode 26 of the thin-film transistor is connected with the signal line D, and the drain electrode 27 of the thin-film transistor is connected with the pixel electrode 25. When the scanning line G provides a scanning signal, the thin-film transistor is turned on, the pixel electrode 25 is connected with the signal line D through the thin-film transistor in order to obtain a data signal provided by the signal line D.

Figure 4A:
FIG. 4a to FIG. 4f are schematic diagrams of forming the pixel structure shown in FIG. 3.

With further reference to FIG. 4a to FIG. 4f, and FIG. 4a to FIG. 4f are schematic diagrams of forming the pixel structure shown in FIG. 3. The formation process of the pixel structure of the present embodiment specifically includes:

Disposing a scanning line G on a substrate (not shown in the figure), as shown in FIG. 4a. Furthermore, disposing a gate electrode of a thin-film transistor on the scanning line G, and disposing a gate insulation layer on the gate electrode. The gate insulation layer covers on the gate electrode and is extended on the substrate (FIG. 4a does not shown the structure of the gate electrode and the gate insulation layer).

Figure 4B:
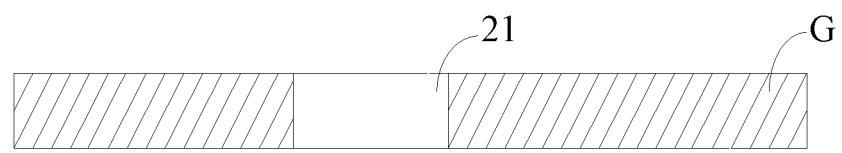

Furthermore, disposing an amorphous silicon layer 21 (Amorphous Si) on the gate electrode of the thin-film transistor, the amorphous silicon layer 21 covers and is disposed on the gate electrode of the thin-film transistor, as shown in FIG. 4b.

Figure 4C:
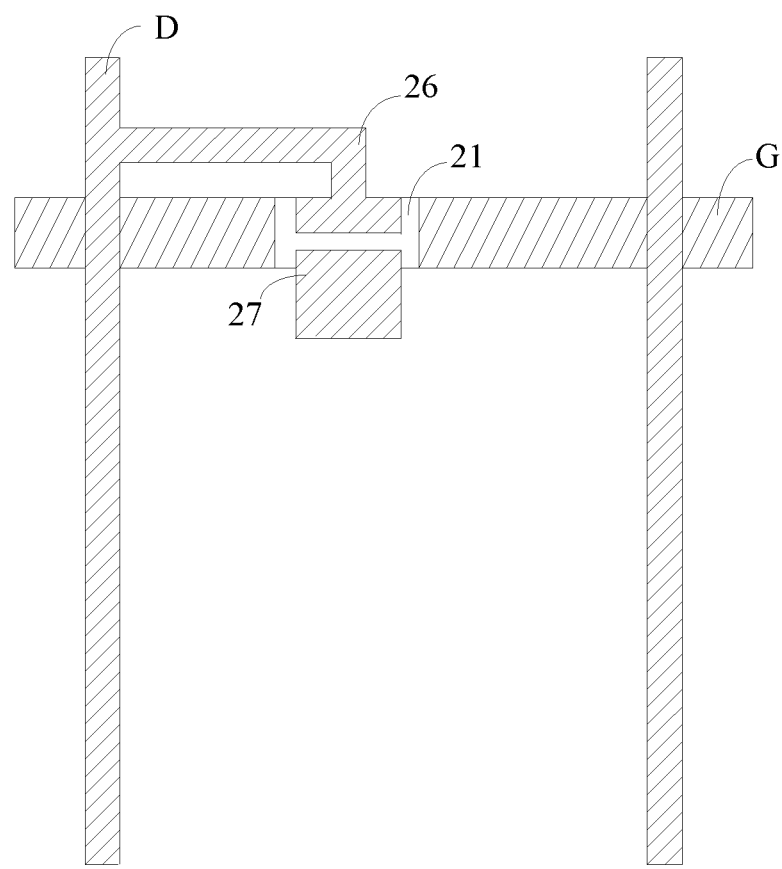

Disposing a signal line D and a source electrode 26 and a drain electrode 27 of the thin-film transistor on the amorphous silicon layer 21. Wherein, the signal line D and the scanning line G are disposed alternately and perpendicularly. The source electrode 26 and the drain electrode 27 of the thin-film transistor are disposed above the amorphous silicon layer, wherein the source electrode 26 of the thin-film transistor is connected with the signal line D as shown in FIG. 4c.

Figure 4D:
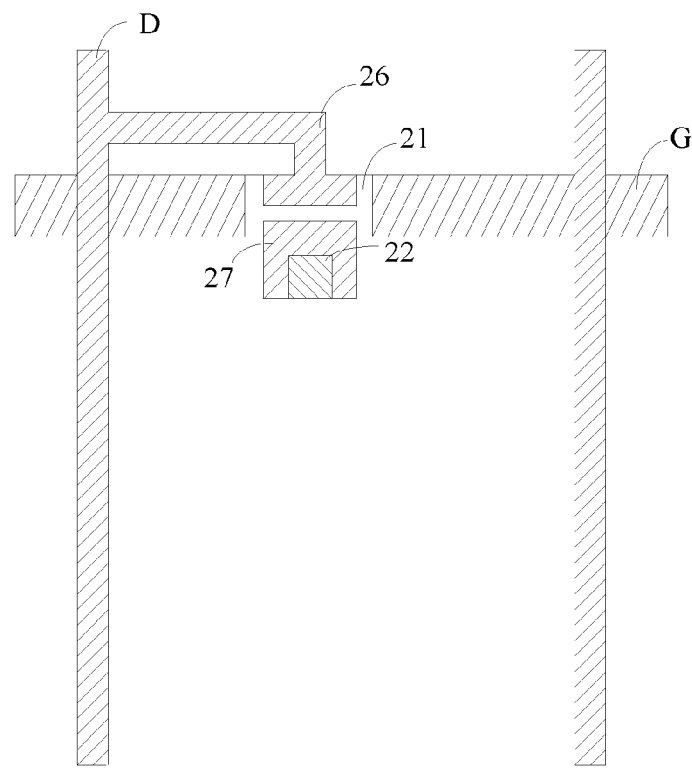

Disposing a PFA organic film layer 22 on the signal line D and the source electrode 26 and the drain electrode 27 of the thin-film transistor as shown in FIG. 4d. Wherein, the PFA organic film layer 22 covers the signal line D, the source electrode 26, the drain electrode 27 and the gate insulation layer. Besides, the PFA organic film layer 22 is provided with a via hole (not shown in the figure).

Figure 4E:
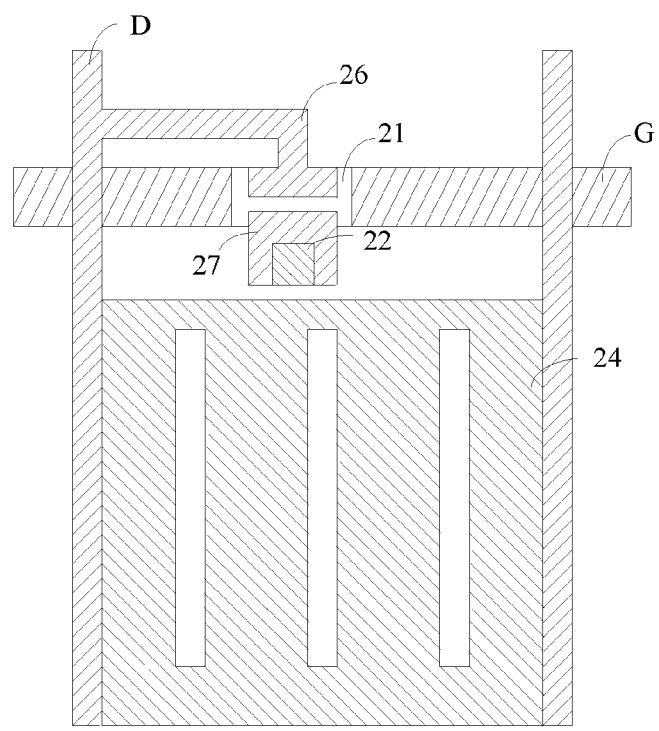

Furthermore, a common electrode 24 is disposed on the PFA organic film layer 22. Wherein, the common electrode 24 has a hollow structure 28, and the hollow structure 28 is disposed separately on the common electrode 24 as shown in FIG. 4e.

Figure 4F:
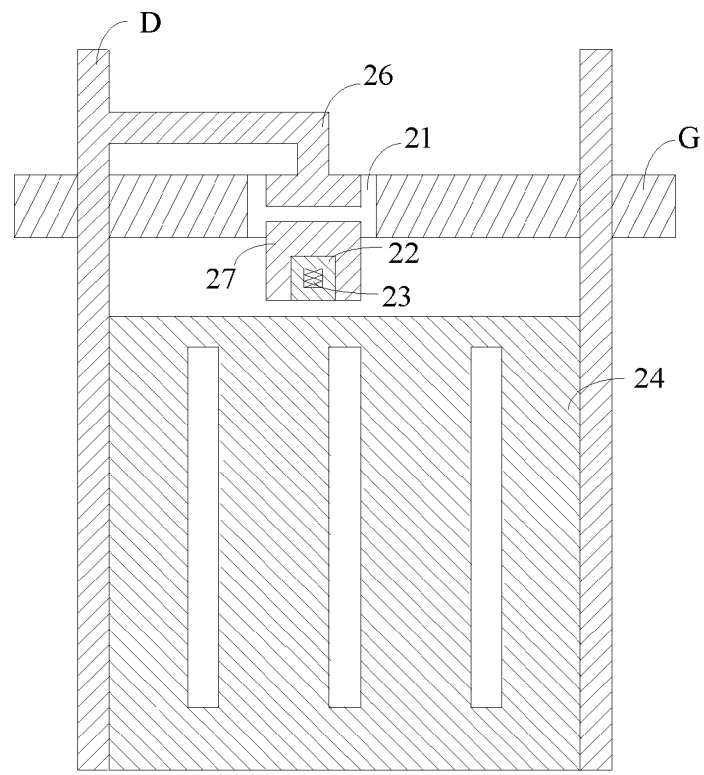

Furthermore, disposing a passivation layer 23 on the common electrode layer 24 as shown in FIG. 4f; wherein, the passivation layer 23 covers on the common electrode 24 and is extended on the PFA organic film layer 22, and above the passivation layer 23, a via hole (not shown in the figure) is also provided.

Furthermore, above the passivation layer 23, multiple pixel electrodes 25 are provided, a diagram after disposing with the pixel electrode 25 is as shown in FIG. 3.

Figure 5:
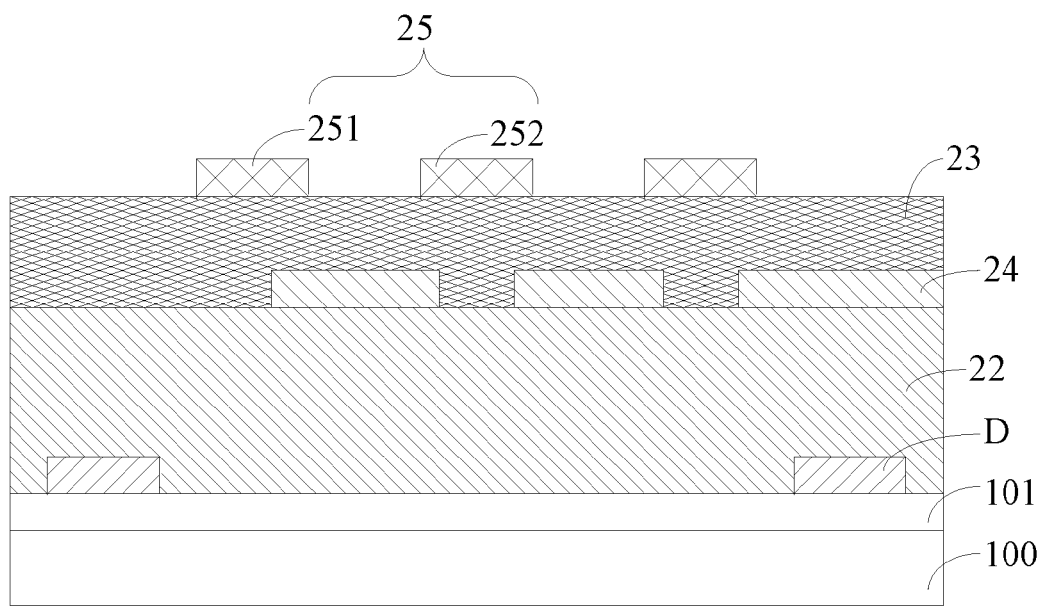
FIG. 5 is a cross-sectional view of a pixel structure along B-B' cutting line shown in FIG. 3 of a first embodiment.

With further reference to FIG. 5, and FIG. 5 is a cross-sectional view of a pixel structure along B-B' cutting line shown in FIG. 3 of a first embodiment. As shown in FIG. 5, it can be seen from cutting the pixel structure of the present embodiment along the B-B' cutting line, the pixel structure of the liquid crystal display panel of the present embodiment includes a substrate 100, a gate insulation layer 101, a signal line D, a PFA organic film layer 22, a common electrode 24, a passivation layer 23 and a pixel electrode 25. Wherein, the gate insulation layer 101 is located on the substrate 100, the signal line D is disposed separately on the gate insulation layer 101, the PFA organic film layer 22 covers on the signal line D and is extended on the gate insulation layer 101, the common electrode 24 is disposed on the PFA organic film layer 22. The common electrode 24 has a hollow structure 28 which is disposed separately. The passivation layer 23 covers the common electrode 24 and is extended on the PFA organic film layer 22. The pixel electrode 25 is disposed separately on the passivation layer 23, and the pixel electrode 25 is partially overlapped with the common electrode 24. A portion of the common electrode 24 that corresponds to an overlapped portion of the common electrode 24 and the pixel electrode 25 is the hollow structure 28, and an area of the hollow structure 28 is less than an area of the pixel electrode 25.

Here, using a first pixel electrode 251 and a second pixel electrode 252 as an example for illustrating. The liquid crystal display panel 2 includes a common electrode 24, a first pixel electrode 251 and a second pixel electrode 252. Wherein, the first pixel electrode 251 and the second pixel electrode 252 are arranged separately. The first pixel electrode 251 and the common electrode 24 are partially overlapped, and the second pixel electrode 252 and the common electrode 24 are partially overlapped. Portions of the common electrode 24 that correspond to an overlapped portion of the common electrode 24 and the first pixel electrode 251 and correspond to an overlapped portion of the common electrode 24 and the second pixel electrode 252 are both hollow structures 28. An area of the hollow structure 28 is less than an area of the first pixel electrode 251 or an area of the second pixel electrode 252. That is, the hollow structure 28 corresponds to a portion region of the first pixel electrode 251 and corresponds to a portion region of the second pixel electrode 252. Wherein, the first pixel electrode 251 and the second pixel electrode 252 are connected with the drain electrode 27 through the via holes provided on the PFA organic film layer 22 and the passivation layer 23.

Figure 6:
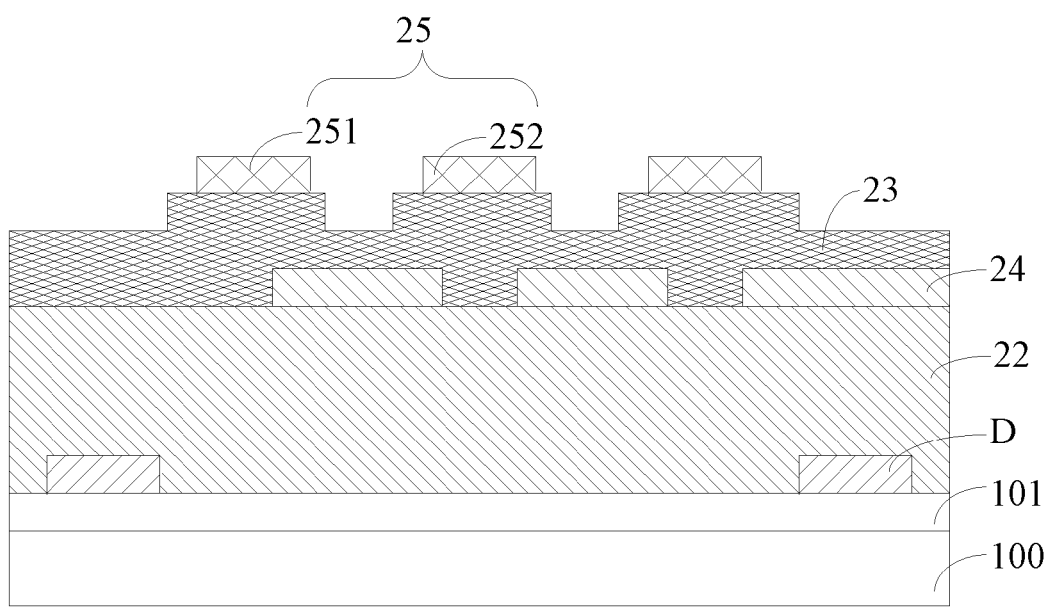
FIG. 6 is a cross-sectional view of a pixel structure along B-B' cutting line shown in FIG. 3 of a second embodiment.

With reference to FIG. 6, and FIG. 6 is a cross-sectional view of a pixel structure along B-B' cutting line shown in FIG. 3 of a second embodiment. Wherein, the difference between the present embodiment and the above embodiment is, portions of the passivation layer 23 that correspond to a non-overlapped region of the common electrode 24 and the pixel electrode 25 are provided with concave slots. The concave slots are formed through performing a dry etching process to the passivation layer 23. That is, portions of the passivation layer 23 that correspond to a non-overlapped region of the common electrode 24 and the first pixel electrode 251 and correspond to a non-overlapped region of the common electrode 24 and the second pixel electrode 252 are provided with the concave slots. Through performing a dry etching process to the passivation layer 23 such that portions of the passivation layer 23 that correspond to a non-overlapped region of the common electrode 24 and the pixel electrode 25 are provided with the concave slots in order to increase the penetration rate of a display area of the liquid crystal display panel.

The present invention also provides a liquid crystal display device, the liquid crystal display device includes the above liquid crystal display panel 2, a backlight module for providing a light source for the liquid crystal display panel and other elements.

In summary, comparing with the conventional art, the liquid crystal display panel and the liquid crystal display device of the present invention, through providing a hollow structure on the common electrode of the array substrate such that an overlapped area between the common electrode and the pixel electrode is decreased in order to realize the purpose of decreasing the storage capacitor between the common electrode and the pixel electrode so as to decrease the driving voltage of the liquid crystal display panel, decreasing the pixel charging time and decreasing the power consumption of the liquid crystal display panel.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal display panel, wherein, the liquid crystal display panel comprises:
   multiple signal lines disposed along a column direction and multiple scanning lines disposed along a row direction, wherein, the multiple scanning lines and the multiple signal lines are alternately disposed to form multiple pixel units;

each pixel unit includes a common electrode disposed between two data lines and having multiple hollow structures, a first pixel electrode and a second pixel electrode, wherein the first pixel electrode and the second pixel electrode are also disposed between the two data lines;

wherein the first pixel electrode and the second pixel electrode are arranged separately; the first pixel electrode and the common electrode are partially overlapped, and the second pixel electrode and the common electrode are partially overlapped; portions of the common electrode that correspond to an overlapped portion of the common electrode and the first pixel electrode and correspond to an overlapped portion of the common electrode and the second pixel electrode are the hollow structures;

wherein a passivation layer is disposed between the common electrode and the first pixel electrode, and is disposed between the common electrode and the second pixel electrode;

wherein portions of the passivation layer that correspond to a non-overlapped region of the common electrode and the first pixel electrode and correspond to a non-overlapped region of the common electrode and the second pixel electrode are provided with multiple concave slots;

wherein at least two of the multiple concave slots are disposed between the first pixel electrode and the second pixel electrode, and the at least two of the multiple concave slots are disposed right above and corresponding to the common electrode;

wherein the liquid crystal display panel further includes a substrate, a gate insulation layer, a signal line and a PFA (polyfluoroalkoxy) organic film layer, wherein, the gate insulation layer is disposed on the substrate;

the signal line is disposed separately on the gate insulation layer;

the PFA organic film layer covers on the signal line and is extended on the gate insulation layer;

the common electrode is disposed on the PFA organic film layer;

the passivation layer covers the common electrode; and the first pixel electrode and the second pixel electrode are disposed separately on the passivation layer.

2. The liquid crystal display panel according to claim 1, wherein, an area of the hollow structure is less than an area of the first pixel electrode or an area of the second pixel electrode.

3. A liquid crystal display device, wherein, the liquid crystal display device includes a liquid crystal display panel, and the liquid crystal display panel comprises:

multiple signal lines disposed along a column direction and multiple scanning lines disposed along a row direction, wherein, the multiple scanning lines and the multiple signal lines are alternately disposed to form multiple pixel units;

each pixel unit includes a common electrode disposed between two data lines and having multiple hollow structures, a first pixel electrode and a second pixel electrode, wherein the first pixel electrode and the second pixel electrode are also disposed between the two data lines;

wherein the first pixel electrode and the second pixel electrode are arranged separately; the first pixel electrode and the common electrode are partially overlapped, and the second pixel electrode and the common electrode are partially overlapped; portions of the common electrode that correspond to an overlapped portion of the common electrode and the first pixel electrode and correspond to an overlapped portion of the common electrode and the second pixel electrode are the hollow structures;

wherein a passivation layer is disposed between the common electrode and the first pixel electrode, and is disposed between the common electrode and the second pixel electrode;

wherein portions of the passivation layer that correspond to a non-overlapped region of the common electrode and the first pixel electrode and correspond to a non-overlapped region of the common electrode and the second pixel electrode are provided with multiple concave slots;

wherein at least two of the multiple concave slots are disposed between the first pixel electrode and the second pixel electrode, and the at least two of the multiple concave slots are disposed right above and corresponding to the common electrode;

wherein the liquid crystal display panel further includes a substrate, a gate insulation layer, a signal line and a PFA (polyfluoroalkoxy) organic film layer, wherein, the gate insulation layer is disposed on the substrate;

the signal line is disposed separately on the gate insulation layer;

the PFA organic film layer covers on the signal line and is extended on the gate insulation layer;

the common electrode is disposed on the PFA organic film layer;

the passivation layer covers the common electrode; and the first pixel electrode and the second pixel electrode are disposed separately on the passivation layer.

4. The liquid crystal display device according to claim 3, wherein, an area of the hollow structure is less than an area of the first pixel electrode or an area of the second pixel electrode.

* * * * *